United States Patent [19]
Kollinek

[11] Patent Number: 5,421,456
[45] Date of Patent: * Jun. 6, 1995

[54] VIDEO CASE AND METHOD OF MANUFACTURING

[75] Inventor: Kurt Kollinek, Wayne, N.J.

[73] Assignee: American Sealcut Corporation, South Hackensack, N.J.

[*] Notice: The portion of the term of this patent subsequent to Oct. 11, 2011 has been disclaimed.

[21] Appl. No.: 188,687

[22] Filed: Jan. 31, 1994

Related U.S. Application Data

[62] Division of Ser. No. 117,400, Sep. 3, 1993, Pat. No. 5,353,932.

[51] Int. Cl.⁶ .......................................... B65D 85/672
[52] U.S. Cl. ................................ 206/387.13; 206/472; 156/292; 156/308.4
[58] Field of Search ............... 206/472, 473, 474, 475, 206/387; 220/4.21, 4.22, 4.23, 4.24, 4.26, 4.27; 156/292, 308.4

[56] References Cited

U.S. PATENT DOCUMENTS

| | | | |
|---|---|---|---|
| 4,778,051 | 10/1988 | Schaub et al. | 206/472 X |
| 4,936,462 | 6/1990 | Yuen | 206/475 X |
| 5,145,068 | 9/1992 | Schmitz et al. | 206/472 |
| 5,351,823 | 10/1994 | Kollinek | 206/387 |
| 5,353,932 | 10/1994 | Kollinek | 206/387 |

Primary Examiner—Jacob K. Ackun

[57] ABSTRACT

A plastic case suitable for housing objects, such as a video cassette, and manufactured by assembling a sandwich of heat-sealable members including a non-heat sealable stiffener member and then moving the assembly to a heat-sealing machine to permanently seal the parts together. To prevent movement of the stiffener member and mis-alignment with the heat-sealable members, one of the heat-sealable members adjacent the stiffener member is provided with a recessed region into which portions of the stiffener member can be pushed and there held in place by an interfering fit until the assembly is permanently sealed together.

9 Claims, 5 Drawing Sheets

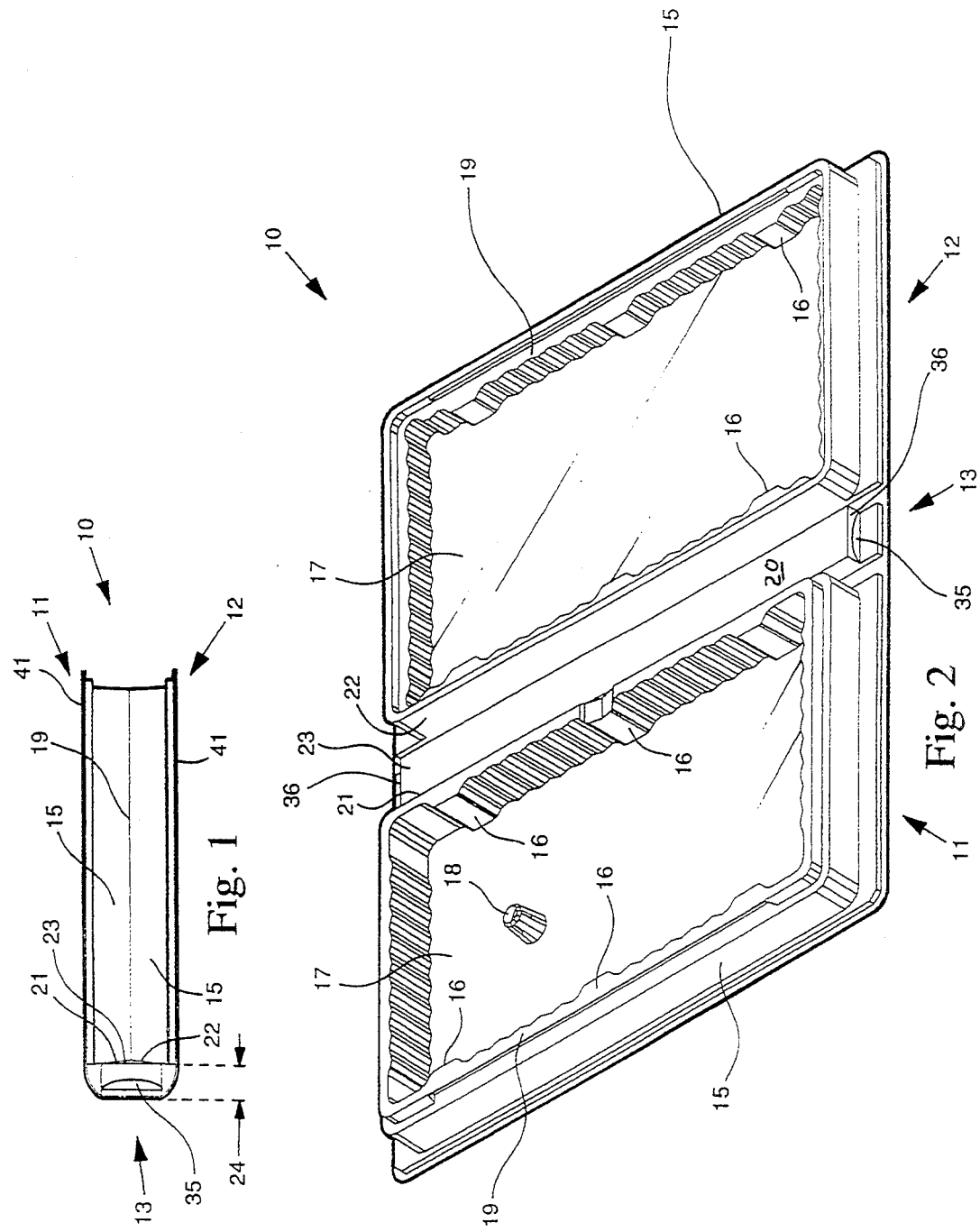

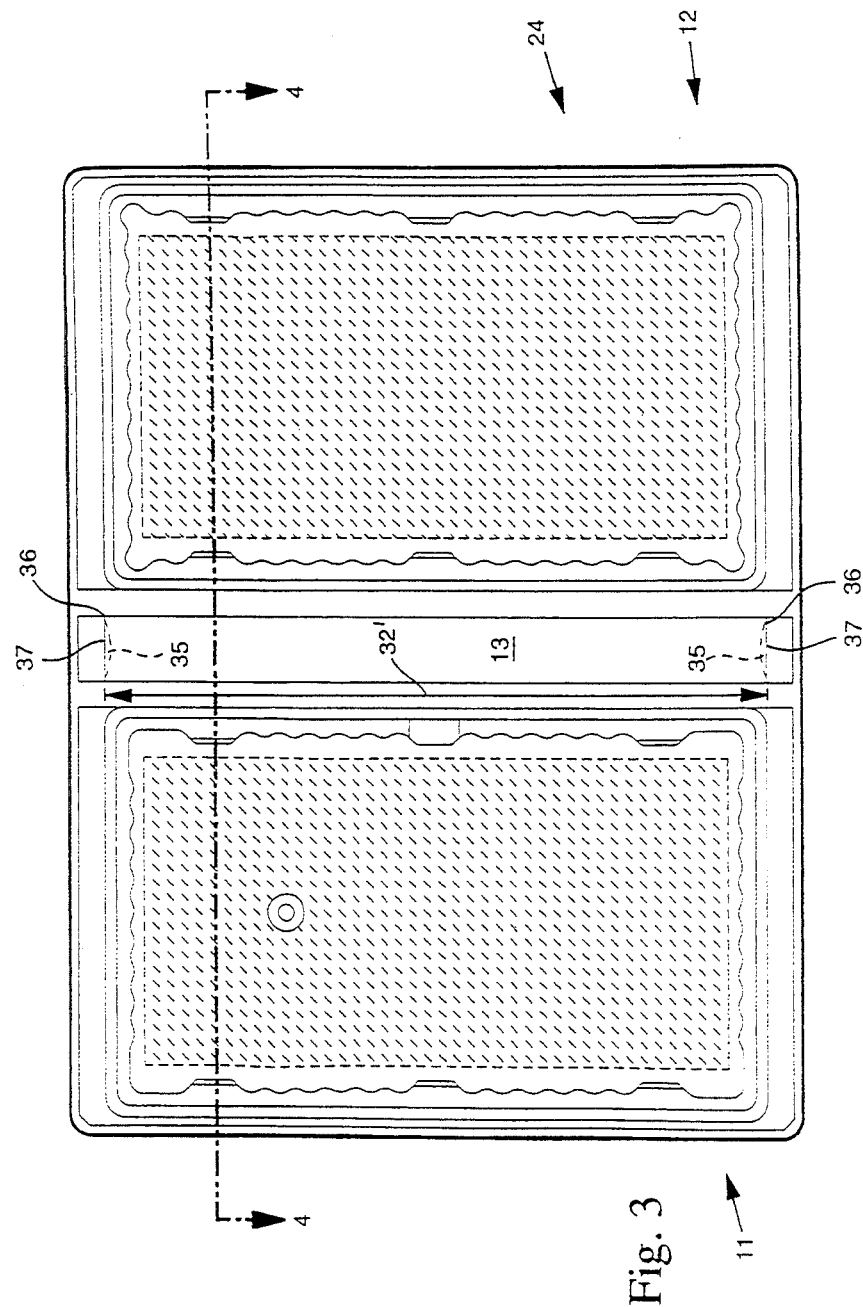
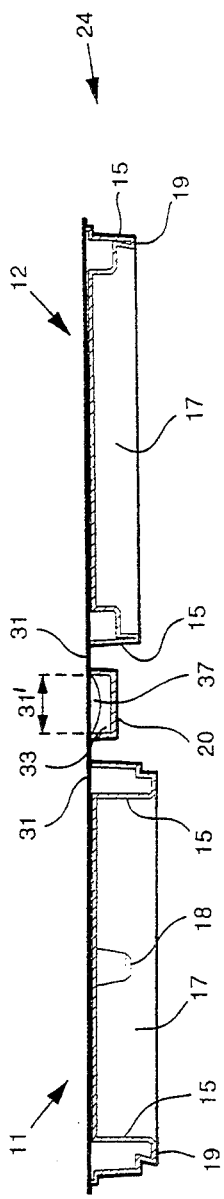
Fig. 3
Fig. 4

VIDEO CASE AND METHOD OF MANUFACTURING

This application is a division of application Ser. No. 08/117,400, filed Sep. 3, 1993, now abandoned, U.S. Pat. No. 5,353,932.

This invention relates to a plastic package, in particular, a mostly plastic case designed to hold various objects, such as, for example, a video cassette.

BACKGROUND OF THE INVENTION

Plastic packages such as video cases have been manufactured for many years. The typical process consists of thermoforming a relatively rigid thermoplastic sheet, such as polyvinyl chloride (PVC), to form opposed inner contoured surfaces configured to receive and hold the video cassette or other object when the case is closed by folding about its spine, then covering the back side of the rigid sheet with a cardboard stiffener, an opaque relatively flexible PVC sheet, and a clear relatively flexible PVC sheet, followed by heat-sealing together the sandwich so formed so as to seal the cardboard stiffener between the rigid PVC and the flexible opaque PVC sheets and the latter to each other and to the clear PVC sheet around three sides so that advertising material for the contents of the case can be inserted through the unsealed fourth side and thus be visible to prospective customers and users of the video cassette. Typically, for PVC, the relatively rigid sheet has a thickness between about 0.008 and 0.030 inches (in.), and the relatively flexible sheets have thicknesses ranging between about 0.003 and 0.020 in. The term "rigid" or "relatively rigid" is a term of art meaning a sheet thickness that will hold its shape when thermoformed, is usually but not always thicker than the flexible sheet or relatively flexible sheets, but still has sufficient flexibility to allow the case to bend easily around its spine and thus easily open and close. However, this degree of flexibility is insufficient to stiffen the case sides, which in use are not supposed to bend. Hence, it is common practice to insert a stiffener member in the case sides to stiffen the latter. Typically, the stiffener member is made of a non-heat-sealable material such as, for example, inexpensive cardboard about 0.018 to 0.120 in. thick, with score lines or slits defining a center spine to allow the flat sides of the stiffener member to bend around the score lines or slits when the case is closed.

The trend for many years has been to reduce the manufacturing cost of such cases. The major expense is labor, and a major way to reduce labor costs is to increase production. Thus, it is common to use so-called turntable machines in the sandwich assembly process, during which at stations situated around the turntable the case elements, including the thermoformed rigid member, the stiffener member, and the two flexible sheets, are assembled and at a final station the assembled sandwiched elements are heat-sealed together as described above.

By rotating the turntable faster, production rate can be increased, but I have found that .the main bottleneck to increasing turntable speed is not the heat-sealing time nor the ability of the production personnel to keep up with the rotating table, but rather the ability to maintain the stiffener member in its proper position aligned with the rigid and flexible members when subjected to the increased centrifugal forces while the turntable is rotating at its faster speed from station to station before the assembly is heat-sealed. Various tricks have been used to fix the position of the stiffener member in the pre-sealed assembly, such as by using pins or adhesives to hold the stiffener member to the rigid member, but these measures have introduced additional steps in the manufacturing process with the result that only minor increases in production rates have resulted.

SUMMARY OF THE INVENTION

An object of the invention is a plastic package construction and method of manufacture that affords a substantial increase in production rates and thus reduced manufacturing costs.

In accordance with one aspect of the invent ion, the thermoformed rigid member and stiffener member are configured so as to cooperate to provide means for temporarily holding the stiffener member aligned in position on the thermoformed rigid member during the assembly process before heat-sealing permanently in place.

In a preferred embodiment in accordance with the invention, the case spine is provided with small projections at positions where they can temporarily hold by an interference fit suitably contoured projections of the stiffener member during the assembly process while the sandwich assembly is moving from station to station until reaching the heat-sealing station.

It turns out, rather remarkably, that by these simple changes in the case contour and stiffener member configuration, the stiffener member is easily snapped manually or by machine beneath the projections and is held so well in place during the assembly process that it is possible to increase the speed of movement of the assembly machine to the point that the production rate of cases increases by as much as 25%.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there are illustrated and described the preferred embodiments of the invention.

BRIEF DESCRIPTION OF THE DRAWINGS

FIG. 1 is a side view of one form of video case in accordance with the invention shown in its closed position;

FIG. 2 is a perspective view of the case of FIG. 1 shown in its open position;

FIG. 3 is a top view of the contoured side of the relatively rigid sheet before assembly into the case of FIG. 1;

FIG. 4 is a cross-sectional view of the case of FIG. 3 along the line 4—4;

DETAILED DESCRIPTION OF THE PREFERRED EMBODIMENTS

Figure 5:
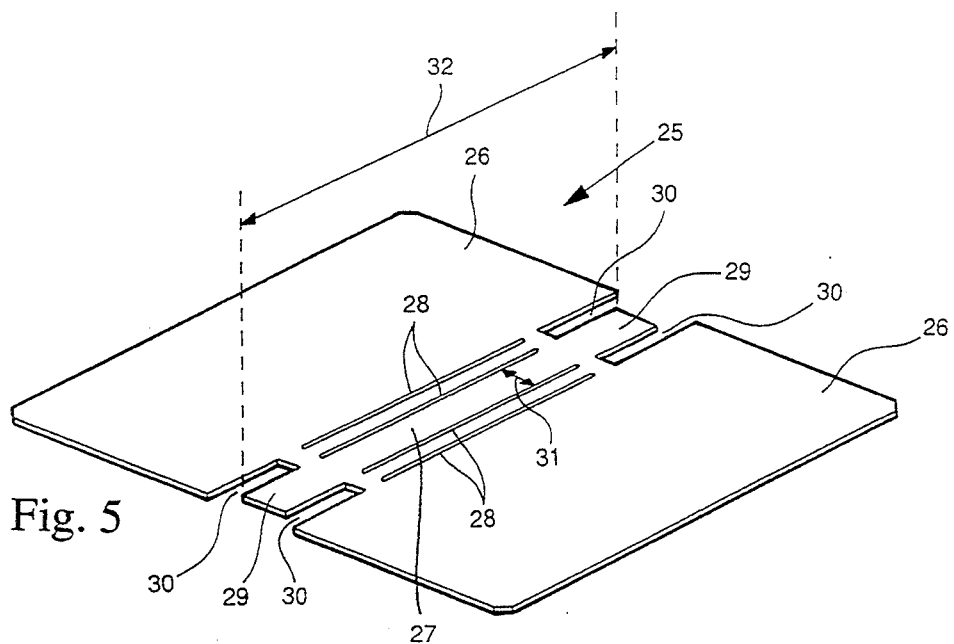
FIG. 5 is a perspective view of the stiffener member used in the case of FIG. 1.

FIG. 1 shows an end view of one form of plastic package or case 10 in accordance with the invention. The case 10 comprises top 11 and bottom 12 covers joined at the left side by spine 13. The position depicted in FIG. 1 is with the case closed and with a possible video cassette or other object (not shown) enclosed within the case 10. FIG. 2 shows the case 10 in its open position with any video cassette removed. Each case side is made up of a continuous wall 15 with opposite projecting portions 16 whose spacing is such as to allow a standard video cassette to fit inside the wells 17 formed by the walled region 15. A projection 18 close to the center on one case side engages an opening in the video cassette when present. The depth of each well 17 formed inside the wall 15 is such as to accommodate one-half of the video cassette thickness so that when the case is folded into its closed position, the top wall surfaces 19 can engage as shown in FIG. 1.

The spine 13 extends down the center of the case between both sides 11, 12. The spine 13 comprises an elongated, generally rectangular member 20 having a height 24 as shown such that the two sides 21, 22 of the adjacent walls 15 of the case sides engage the top surface 23 of the spine 20 which helps to align the case sides so t hat they close easily. The contact is shown in FIG. 1.

The case 10 in FIG. 2 is manufactured in a preferred embodiment of the invention as follows. A sheet of any rigid thermoplastic material, such as PVC or styrene, is placed over a suitable vacuum mold and subjected to heat and pressure in a conventional manner to cause the sheet to soften and conform to the mold surfaces to produce one or more contoured members 24 as shown in FIGS. 3 and 4. The contoured member 24 retains its molded shape, which is the reason why it is referred to in the art as rigid PVC. To clarify the description, the same reference numerals will be used for the member 24 as was used for the completed case 10. Thus, two adjacent case halves 11 and 12 are formed joined at their center by a spine 13 forming an integral thermoformed thermoplastic member. The cross-section of this rigid member is shown in FIG. 4.

As explained above, a stiffener member 25 is added to stiffen the covers. A perspective view of one form of stiffener member 25 in accordance with the invention is shown in FIG. 5. It is preferably made of stiff cardboard, typically about 0.018 to 0.120 in. thick, chosen because of its low cost. It comprises a configuration formed by die-cutting to provide side by side flat sections 26 joined by a center section which will be referred to herein as the stiffener member spine 27. The stiffener member spine 27 is separated from the flat sections 26 by slits 28 formed on opposite sides of the stiffener member spine 27. The stiffener member spine terminates at opposite sides in two projecting sections 29 separated from the main stiffener member sides 26 by wide slots 30. The configuration is chosen such that: the two stiffener members can fold about the slits 28; the width 31 of the stiffener spine 27 matches or is slightly smaller than the width 31' of the case spine 20 (FIG. 4); the length 32 of the stiffener spine 27 between the ends of the projections 29 is substantially equal to or slightly larger than (more on this below) the length 32' of the case spine 20 (FIG. 4); the slots 30 accommodate regions 31" of the rigid thermoformed member 24 which protrude into the open space formed by the slots 30 and thus allow the projections 29 to be bent or snapped into the spine well 33 as will be explained below.

FIG. 3 also shows that at the back side of the thermoformed member 24, the mold which formed it was configured to form an undercut or recessed region 35 in both the top and bottom ends of the spine well 33 along both of its short sides 36. This undercut 35 forms at each wall end a small projection 37 extending inwardly beyond the recessed region 35 about 0.015-0.038 in., i.e., from the spine short side 36 toward the adjacent spine end. The length 32 of the stiffener spine between the ends of the projecting sections 29 is slightly larger than the length 32' of the spine well, by an amount about equal to the recessed region 35 depth of 0.015-0.038 in. As a result, the small projections 37 will interfere with the stiffener spine center section when the stiffener projecting sections 29 are pushed into the spine well 33 at opposite ends. The cardboard 25 is sufficiently flexible so that both projections 29 will bend when encountering the spine projections 37 and thus are easily pushed into the spine well 33 past the spine projections 37 and snap into place under the projections 37 inside the recessed regions 35 at opposite ends and in that position the cardboard stiffener will be held in place in perfect alignment with the underlying rigid member 24 however fast the assembly is moved on a production machine, particularly a turntable machine as previously described.

Figure 6:
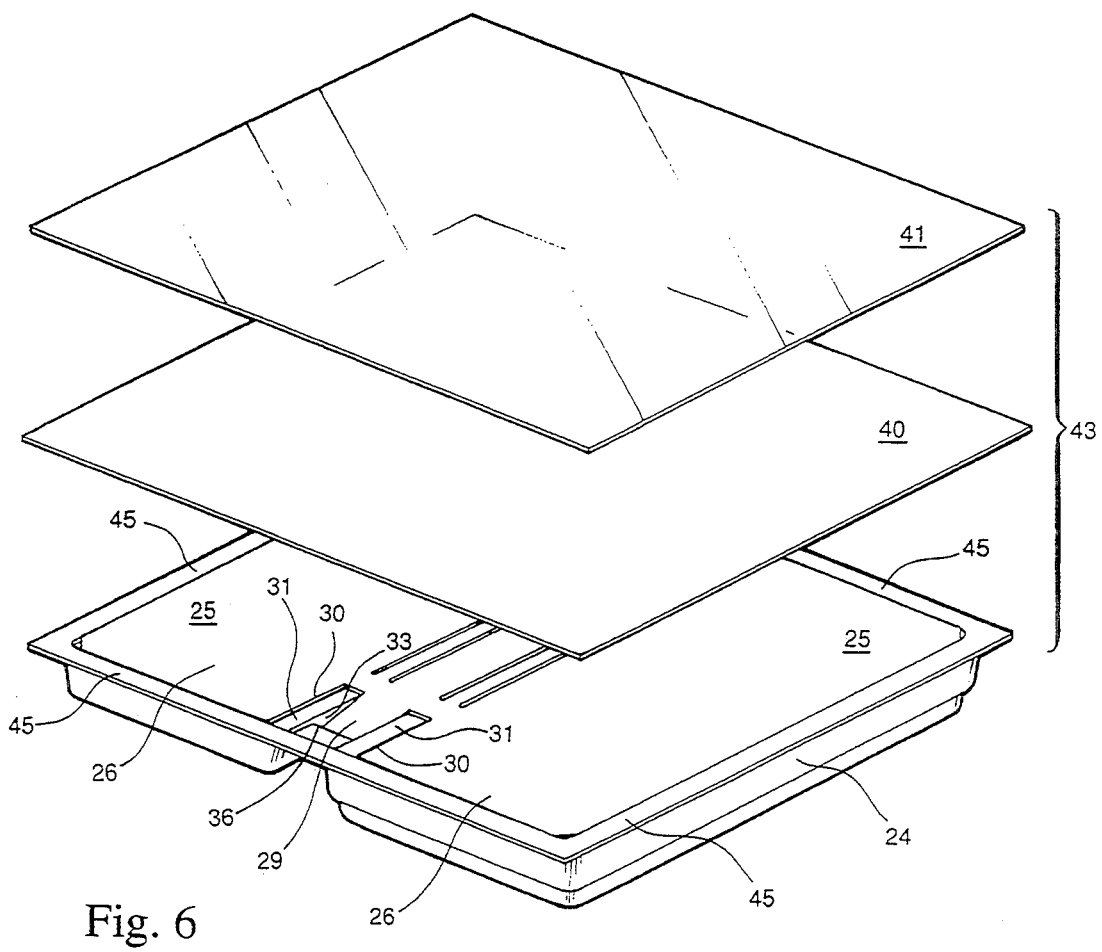
FIG. 6 is an exploded view showing the stiffener member of FIG. 5 held in position on the back side of the relatively rigid member of FIG. 3 with the two relatively flexible sheets ready to be placed on top of the stiffener member to form a complete case.

FIG. 6 shows how the stiffener member projecting sections 29 are bent downward to be positioned underneath the spine projections 37 and thus held at opposite ends in proper position during subsequent processing. The further processing consists of laying over the stiffener member 25 the opaque relatively flexible thermoplastic sheet 40 followed by the clear relatively flexible thermoplastic sheet 41. The turntable then rotates the assembly 43 between the electrodes of a conventional heat-sealing machine which seals the periphery indicated at 45 on the rigid member 24 of the assembly permanently securing the stiffener member 25 in position. While not important to the invention, during the pressure applied by the closed electrodes of the heat-sealing machine, the stiffener member end projections 29 will likely come out of their held positions and return to a fully flat position.

Figure 7:
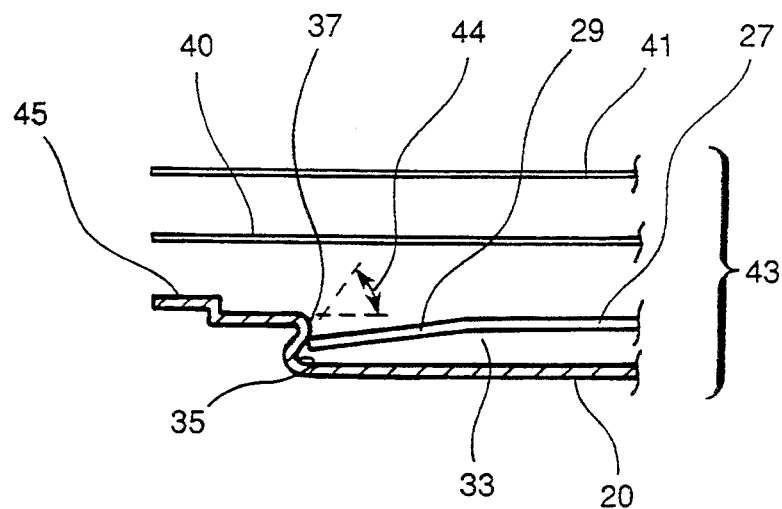
FIG. 7 is a cross-sectional view of one spine end of the assembly of FIG. 6, along the line 7—7 of FIG. 8.
Figure 8:
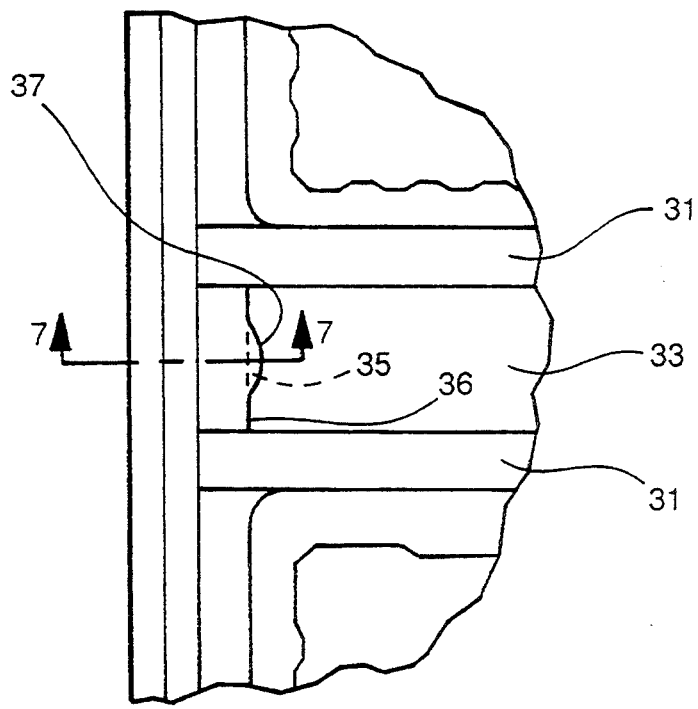
FIG. 8 is a top view of one spine end of the assembly of FIG. 6 before heat-sealing.

The important consideration is the cooperation of the spine well projections 37 and the dimensioning of the stiffener member spine 27 so that the end projections 29 are easily pushed into a temporarily locked position by an interference fit during the steps preceding the heat-sealing operation. I have found that a recessed area depth forming a project i on of about 0.01 5-0.038 in. works satisfactorily with 0.018 to 0.120 in. thick cardboard. For thinner cardboard, a recess depth of about 0.010 in. will be satisfactory, and for thicker cardboard, a recess depth up to about 0.120 in. can be used. However, it will be understood that the invention is not limited to such dimensions and other sized projections with stiffener members of a different thickness dimension will also prove satisfactory so long as the interference fit between the two is sufficient to allow the stiffener ends 29 to be easily pushed into the recessed area 35 under the projections 37 and held therein while the assembly is moved to the subsequent station or stations culminating in the heat-sealing station. For ease of manufacture, it is preferred that the recess 35 in the spine well ends not form a step but rather an inclined surface forming as shown at 44 in FIG. 7 an angle preferably between about 15°–30°.

Figure 9:
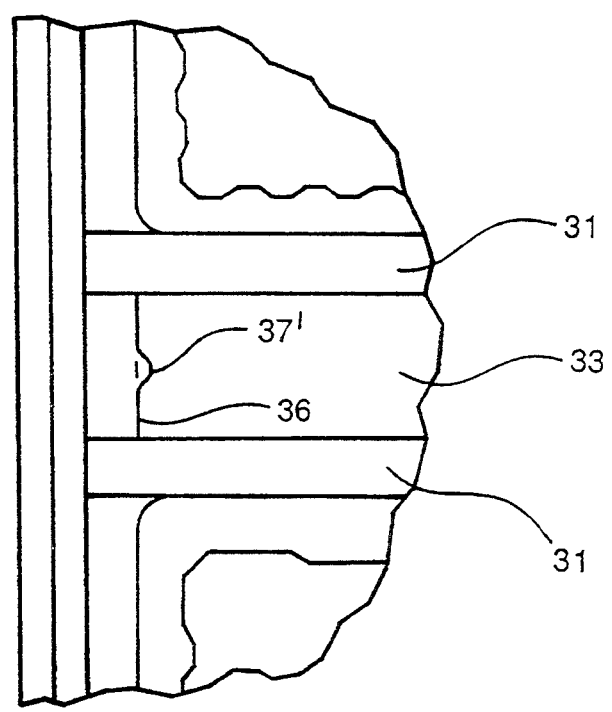
FIG. 9 is a view similar to FIG. 8 of a modification of FIG.

FIG. 9 shows a modification in which no recessed region is formed at the spine well ends but small spot projections 37' are provided in the flat spine well ends 36. In this case, the stiffener member would look the same as illustrated in FIG. 5, but the length 32 between the ends of the stiffener member projecting portions 29 would be slightly smaller to provide the same interfering action desired.

While the invention has been described particularly in connection with its application to a case for storing a video cassette, it will be understood that the invention is also applicable to any plastic package or case for holding any kind of an object, such as crayons, toys or cosmetics, and requiring a stiffener member and which is manufactured by forming a sandwich assembly of the case parts including a stiffener member and in which the assembly is moved to at least one station before heat-sealing the parts together. Similarly, the invention is not limited to the manufacture of the product by a turntable machine but is also applicable to in-line production machines where subassemblies are moved from station to station during manufacture.

While the invention has been described connection with preferred embodiments, it will be understood that modifications thereof within the principles outlined above will be evident to those skilled in the art and thus the invention is not limited to the preferred embodiments but is intended to encompass such modifications.

What is claimed is:

1. A foldable case for holding a video cassette, comprising:
   a) first and second case sections joined by an integral flexible spine to form an integral body, each of the first and second case sections having on a first major side an area defined by walls forming a well for receiving the video cassette such that the case sections can be closed with the cassette inside and having on a second major side opposite to the first side a generally flat surface, the integral flexible spine having a short width dimension transverse to the first and second case sections and a longitudinal dimension transverse to its width dimension,
   b) said first and second case sections and integral flexible spine comprising a sandwich made up of a thermoformed sheet of relatively rigid heat-sealable thermoplastic material facing said first major side, a stiffener member of a sheet-like non-heat-sealable material on said thermoformed sheet on the second major side, and at least one relatively flexible sheet of heat-sealable thermoplastic material over the stiffener member and heat-sealed around its periphery to the periphery of the thermoformed sheet so as to enclose the stiffener member,
   c) said stiffener member having a center spine portion configured to align with the flexible spine and separated by slits from opposite adjacent side portions, said center spine portion of the stiffener member having opposed end projections separated by slots from the opposite adjacent side portions,
   d) said flexible spine on the first major side having a raised portion with a flat surface located between said first and second case sections and extending a substantial distance along its longitudinal dimension, the height of the raised portion being such that, when the first and second case sections are folded toward one another in the process of closing the case, the facing portions of the walls adjacent to the flexible spine engage the flat surface of the raised portion of the flexible spine causing the first and second case sections to align with one another while closing.

2. The case of claim 1, wherein the slits and slots of the stiffener member are aligned with each other.

3. The case of claim 1, wherein the end projections are configured such that they can be fitted into the spine well and temporarily locked in place by an interference fit with the spine well sides.

4. The case of claim herein the flexible spine on its second major side has a generally elongated rectangular well having long sides and short sides joining the long sides.

5. A stiffener member for a video cassette case, comprising a stiff sheet of non-heat-sealable material configured to form flat adjacent opposed side sections separated by a center spine portion configured to align with a flexible spine of the case, each of said adjacent side sections being separated by slits from the center spine portion, said center spine portion of the stiffener member having end projections separated by slots from the adjacent side portions, whereby the adjacent side sections can fold about the spaced slits and slots when the case is folded to a closed position.

6. The stiffener member of claim 5, wherein the slits and slots of the stiffener member are aligned with each other.

7. The stiffener member of claim 5, wherein there are two spaced slits between the spine portion and each of the side portions.

8. A method of manufacturing a plastic package comprising first and second case sections joined by a flexible spine to form an integral body, each case section having on a first side a walled area defining a well for receiving an object such that the case sections can be closed with the object inside and a generally flat side on a second side opposite to the first side, comprising the steps:
   a) thermoforming a sheet of relatively rigid heat-sealable thermoplastic material to form the first case side,
   b) forming a stiffener member of a sheet-like non-heat-sealable material and providing same on said thermoformed sheet on the second side, said stiffener member having flexible end portions,
   c) said thermoformed sheet having on its second side a spine having a generally elongated well having long side edges and short side edges at top and bottom, said spine further having means for forming an interference fit with the flexible end portions of the stiffener member,
   d) pressing the flexible end portions of the stiffener member into the thermoformed sheet spine to engage the means for forming an interference fit thereby to temporarily hold the stiffener member properly aligned with the thermoformed sheet during manufacture,
   e) providing over the stiffener member at least one relatively flexible sheet of heat-sealable thermoplastic material,
   f) heat-sealing around its periphery the flexible sheet to the periphery of the thermoformed sheet so as to enclose the stiffener member.

9. The method of claim 8, wherein at least steps d), e) and f) are carried out at stations located on a turntable or in-line machine.

* * * * *